United States Patent
Madduri et al.

(10) Patent No.: US 10,795,677 B2
(45) Date of Patent: Oct. 6, 2020

(54) SYSTEMS, APPARATUSES, AND METHODS FOR MULTIPLICATION, NEGATION, AND ACCUMULATION OF VECTOR PACKED SIGNED VALUES

(71) Applicant: Intel Corporation, Santa Clara, CA (US)

(72) Inventors: Venkateswara R. Madduri, Austin, TX (US); Elmoustapha Ould-Ahmed-Vall, Chandler, AZ (US); Robert Valentine, Kiryat Tivon (IL); Jesus Corbal, King City, OR (US); Mark Charney, Lexington, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/721,599

(22) Filed: Sep. 29, 2017

(65) Prior Publication Data
US 2019/0102185 A1   Apr. 4, 2019

(51) Int. Cl.
*G06F 9/30* (2018.01)
*G06F 7/48* (2006.01)
(Continued)

(52) U.S. Cl.
CPC ........ *G06F 9/30036* (2013.01); *G06F 7/4824* (2013.01); *G06F 7/5443* (2013.01);
(Continued)

(58) Field of Classification Search
None
See application file for complete search history.

(56) References Cited

U.S. PATENT DOCUMENTS

| 4,202,039 A | 5/1980 | Penoy et al. |
| 4,937,775 A | 6/1990 | Ngeler et al. |

(Continued)

FOREIGN PATENT DOCUMENTS

| FR | 2793971 A1 | 11/2000 |
| WO | 2013095552 A1 | 6/2013 |

OTHER PUBLICATIONS

Abu Taha M., et al., "A Practical One Way Hash Algorithm Based on Matrix Multiplication, " International Journal of Computer Applications, vol. 23 (2), Jun. 2011, 5 pages.
(Continued)

*Primary Examiner* — Corey S Faherty
(74) *Attorney, Agent, or Firm* — Nicholson De Vos Webster & Elliot LLP

(57) ABSTRACT

Embodiments of systems, apparatuses, and methods for multiplication, negation, and accumulation of data values in a processor are described. For example, execution circuitry executes a decoded instruction to multiply selected data values from a plurality of packed data element positions in first and second packed data source operands to generate a plurality of first result values, sum the plurality of first result values to generate one or more second result values, negate the one or more second result values to generate one or more third result values, accumulate the one or more third result values with one or more data values from the destination operand to generate one or more fourth result values, and store the one or more third result values in one or more packed data element positions in the destination operand.

24 Claims, 12 Drawing Sheets

(51) Int. Cl.
*G06F 7/544* (2006.01)
*G06F 17/16* (2006.01)

(52) U.S. Cl.
CPC .......... *G06F 9/3001* (2013.01); *G06F 9/3016* (2013.01); *G06F 17/16* (2013.01)

(56) References Cited

U.S. PATENT DOCUMENTS

| | | |
|---|---|---|
| 5,119,484 A | 6/1992 | Fox |
| 5,170,370 A | 12/1992 | Lee et al. |
| 5,442,577 A | 8/1995 | Cohen |
| 5,721,892 A | 2/1998 | Peleg et al. |
| 5,880,985 A | 3/1999 | Makineni et al. |
| 5,936,872 A | 8/1999 | Fischer et al. |
| 5,953,241 A | 9/1999 | Hansen et al. |
| 5,983,253 A | 11/1999 | Fischer et al. |
| 6,058,408 A | 5/2000 | Fischer et al. |
| 6,237,016 B1 | 5/2001 | Fischer et al. |
| 6,272,512 B1 | 8/2001 | Golliver et al. |
| 6,366,937 B1 | 4/2002 | Shridhar et al. |
| 6,385,634 B1 | 5/2002 | Peleg et al. |
| 6,470,370 B2 | 10/2002 | Fischer et al. |
| 6,523,055 B1 | 2/2003 | Yu et al. |
| 6,542,916 B1 | 4/2003 | Hinds et al. |
| 6,609,140 B1 | 8/2003 | Greene |
| 6,675,187 B1 | 1/2004 | Greenberger |
| 6,823,353 B2 | 11/2004 | Fischer et al. |
| 6,826,587 B1 | 11/2004 | Montalvo et al. |
| 7,072,929 B2 | 7/2006 | Pechanek et al. |
| 7,219,212 B1 | 5/2007 | Sanghavi et al. |
| 7,392,368 B2 | 6/2008 | Khan et al. |
| 7,424,594 B2 | 9/2008 | Pitsianis et al. |
| 7,546,329 B2 | 6/2009 | Taunton |
| 7,546,330 B2 | 6/2009 | Taunton |
| 7,555,514 B2 | 6/2009 | Pedersen et al. |
| 7,593,978 B2 | 9/2009 | Schulte et al. |
| 7,873,812 B1 | 1/2011 | Mimar |
| 7,962,719 B2 | 6/2011 | Pitsianis et al. |
| 8,229,991 B2 | 7/2012 | Tran et al. |
| 8,271,571 B2 | 9/2012 | Matsuyama et al. |
| 8,443,170 B2* | 5/2013 | Wilder ................ G06F 9/3001 712/22 |
| 8,458,442 B2 | 6/2013 | Eichenberger et al. |
| 8,595,280 B2* | 11/2013 | Symes ................ G06F 9/3887 708/523 |
| 8,650,240 B2 | 2/2014 | Eichenberger et al. |
| 8,904,152 B2 | 12/2014 | Pitsianis et al. |
| 9,015,354 B2 | 4/2015 | Pitsianis et al. |
| 9,104,510 B1 | 8/2015 | Rub et al. |
| 9,118,631 B1 | 8/2015 | Yung et al. |
| 9,411,583 B2 | 8/2016 | Sair et al. |
| 9,465,611 B2 | 10/2016 | Taunton et al. |
| 9,489,197 B2 | 11/2016 | Rahman et al. |
| 9,519,460 B1 | 12/2016 | Farooqui et al. |
| 9,778,905 B1 | 10/2017 | Walke et al. |
| 9,910,671 B2 | 3/2018 | Li et al. |
| 10,180,820 B2* | 1/2019 | Buchanan ............... G06F 7/523 |
| 2002/0004809 A1 | 1/2002 | Golliver et al. |
| 2002/0169813 A1 | 11/2002 | Pechanek et al. |
| 2003/0009502 A1 | 1/2003 | Katayanagi |
| 2003/0014457 A1 | 1/2003 | Desai et al. |
| 2003/0014458 A1 | 1/2003 | Fischer et al. |
| 2003/0084083 A1 | 5/2003 | Hull et al. |
| 2003/0088601 A1 | 5/2003 | Pitsianis et al. |
| 2004/0078404 A1 | 4/2004 | Macy et al. |
| 2004/0117422 A1 | 6/2004 | Debes et al. |
| 2004/0210616 A1 | 10/2004 | Debes et al. |
| 2004/0221137 A1 | 11/2004 | Pitsianis et al. |
| 2005/0071414 A1 | 3/2005 | Taunton |
| 2005/0071415 A1 | 3/2005 | Taunton |
| 2005/0172106 A1 | 8/2005 | Ford et al. |
| 2005/0182813 A1 | 8/2005 | Cho et al. |
| 2005/0193185 A1 | 9/2005 | Taunton et al. |
| 2005/0198473 A1 | 9/2005 | Ford |
| 2006/0015702 A1 | 1/2006 | Khan et al. |
| 2007/0192399 A1 | 8/2007 | Krithivasan et al. |
| 2007/0239968 A1 | 10/2007 | Moyer et al. |
| 2008/0046704 A1 | 2/2008 | Tanaka et al. |
| 2008/0270768 A1 | 10/2008 | Khan et al. |
| 2008/0301414 A1 | 12/2008 | Pitsianis et al. |
| 2009/0055455 A1 | 2/2009 | Matsuyama et al. |
| 2010/0274990 A1 | 10/2010 | Wilder et al. |
| 2011/0225224 A1 | 9/2011 | Pitsianis et al. |
| 2012/0072704 A1 | 3/2012 | Johnson et al. |
| 2012/0166511 A1 | 6/2012 | Hiremath et al. |
| 2012/0284464 A1 | 11/2012 | Padaki et al. |
| 2012/0284487 A1 | 11/2012 | Saha et al. |
| 2013/0262547 A1 | 10/2013 | Peleg et al. |
| 2013/0275731 A1 | 10/2013 | Sair et al. |
| 2014/0164733 A1 | 6/2014 | Jha et al. |
| 2014/0189231 A1 | 7/2014 | Maydan et al. |
| 2014/0304493 A1 | 10/2014 | Zhong et al. |
| 2014/0379774 A1 | 12/2014 | Gupta et al. |
| 2015/0019842 A1 | 1/2015 | Rahman et al. |
| 2015/0039856 A1 | 2/2015 | Pitsianis et al. |
| 2015/0143078 A1 | 5/2015 | Khan et al. |
| 2015/0149744 A1 | 5/2015 | Pedersen et al. |
| 2015/0339101 A1 | 11/2015 | Dupont et al. |
| 2016/0179523 A1 | 6/2016 | Ould-Ahmed-Vall Elmoustapha et al. |
| 2016/0224514 A1 | 8/2016 | Moudgill et al. |
| 2018/0095758 A1 | 4/2018 | Dubtsov et al. |
| 2018/0113708 A1 | 4/2018 | Corbal et al. |
| 2019/0102193 A1 | 4/2019 | Madduri et al. |
| 2019/0163472 A1 | 5/2019 | Valentine et al. |
| 2019/0163473 A1 | 5/2019 | Valentine et al. |

OTHER PUBLICATIONS

Agrawal D.P., et al., "On Multiple Operand Addition of Signed Binary Numbers," IEEE Transactions on Computers, vol. c-27, No. 11, Nov. 1978, pp. 1068-1070.
Bacon D., "CSEP 590tv: Quantum Computing," Jun. 29, 2005, 64 pages.
Dolmatov V., et al., "Gost R 34.11-2012: Hash Function," Aug. 2013, 64 pages.
Final Office Action from U.S. Appl. No. 15/721,529, dated Mar. 21, 2019, 10 pages.
Final Office Action from U.S. Appl. No. 15/721,458, dated May 3, 2019, 17 pages.
Hamamreh R., et al., "Hash Algorithm for Data Integrity Based on Matrix Combination," The 14th International Arab Conference on Information Technology (ACIT'2013), Feb. 2014, 5 pages.
Hilewitz Y., et al., "Advanced Bit Manipulation Instruction Set Architecture," Princeton University, Nov. 2006, 17 pages.
Hilewitz Y., et al., "Bit matrix multiplication in commodity processors," 2008 International Conference on Application-Specific Systems, Architectures and Processors, 2008, pp. 7-12.
Mahajan n. V., et al., "Simple Computation of DIT FFT," International Journal of Advanced Research in Computer Science and Software Engineering, May 2014, vol. 4 (5), pp. 353-356.
Mathcentre., "The complex conjugate," 2009, retrieved from http://www.mathcentre.ac.uldresources/sigma%20complex%20number%20Ieaflets/sigma-complex6-2009-1.pdf, 1 page.
Non-Final Office Action from U.S. Appl. No. 15/721,448, dated Nov. 16, 2018, 17 pages.
Non-Final Office Action from U.S. Appl. No. 15/721,458, dated Dec. 5, 2018, 18 pages.
Non-Final Office Action from U.S. Appl. No. 15/721,529, dated Nov. 19, 2018, 10 pages.
Non-Final Office Action from U.S. Appl. No. 15/721,145, dated Apr. 4, 2019, 17 pages.
Non-Final Office Action from U.S. Appl. No. 15/721,261, dated Mar. 15, 2019, 10 pages.
Non-Final Office Action from U.S. Appl. No. 15/721,313, dated Apr. 16, 2019, 18 pages.
Non-Final Office Action from U.S. Appl. No. 15/721,616, dated Mar. 21, 2019, 27 pages.

(56) References Cited

OTHER PUBLICATIONS

Non-Final Office Action from U.S. Appl. No. 15/721,627, dated Mar. 21, 2019, 27 pages.
Notice of Allowance from U.S. Appl. No. 15/721,412, dated Feb. 13, 2019, 8 pages.
Notice of Allowance from U.S. Appl. No. 15/721,459, dated Mar. 6, 2019, 5 pages.
Notice of Allowance from U.S. Appl. No. 15/721,459, dated Feb. 13, 2019, 9 pages.
Requirement for Restriction/Election from U.S. Appl. No. 15/721,225, dated Jan. 9, 2019, 6 pages.
Ryan T., "How Do You Find the Product of 7-2i and its Conjugate?," from Socratic, Dec. 24, 2015, retrieved from https://socratic.org/questions/how-do-you-find-the-product-of-7-21-and-its-conjugate, 1 page.
Slade G.W., "The Fast Fourier Transform in Hardware: A Tutorial Based on an FPGA Implementation," Mar. 21, 2013, pp. 1-26.
Stack Overflow, "Binary Matrix Multiplication Bit Twiddling Hack," retrieved from http://stackoverflow.com/questions/18447321/binary-matrix-multiplication-bit-twiddling-hack, Aug. 26, 2013, 7 pages.
Van Amstel D., "Efficient and Scalable Bit-Matrix Multiplication in Bit-Slice Format," ACM SAC 2012, Mar. 2012, 6 pages.
Final Office Action, U.S. Appl. No. 15/721,448, dated Feb. 11, 2020, 19 pages.
Non-Final Office Action, U.S. Appl. No. 16/672,203, dated May 15, 2020, 6 pages.
5.6. Negative Values—Two's Complement—CS160 Reader' archived from Jul., 2016 from http://computerscience.chemeketa.edu . (Year: 2016).
Ex Parte Quayle Action, U.S. Appl. No. 15/721,145, dated Jan. 13, 2020, 7 pages.
Ex Parte Quayle Action, U.S. Appl. No. 15/721,145, dated Sep. 6, 2019, 9 pages.
Final Office Action, U.S. Appl. No. 15/721,225, dated Jan. 14, 2020, 7 pages.
Final Office Action, U.S. Appl. No. 15/721,313 , dated Sep. 10, 2019, 28 pages.
Final Office Action, U.S. Appl. No. 15/721,616, dated Oct. 28, 2019, 28 pages.
Final Office Action, U.S. Appl. No. 15/721,627, dated Oct. 28, 2019, 29 pages.
Non-Final Office Action for U.S. Appl. No. 15/721,225, dated Aug. 13, 2019, 20 pages.
Non-Final Office Action from U.S Appl. No. 15/721,464, dated May 15, 2019, 22 pages.
Non-Final Office Action, U.S. Appl. No. 15/721,225, dated Aug. 13, 2019, 20 pages.
Non-Final Office Action, U.S. Appl. No. 15/721,448, dated Jun. 19, 2019, 13 pages.
Notice of Allowance, U.S. Appl. No. 15/721,261, dated Nov. 12, 2019, 6 pages.
Notice of Allowance, U.S. Appl. No. 15/721,261, dated Aug. 14, 2019, 8 pages.
Notice of Allowance, U.S. Appl. No. 15/721,313, dated Jan. 22, 2020, 10 pages.
Notice of Allowance, U.S. Appl. No. 15/721,464, dated Aug. 29, 2019, 24 pages.
Notice of Allowance, U.S. Appl. No. 15/721,464, dated Jan. 8, 2020, 5 pages.
Notice of Allowance, U.S. Appl. No. 15/721,529, dated Sep. 5, 2019, 5 pages.
Van Zee F.G., et al., "Implementing High-Performance Complex Matrix Multiplication via the 3m and 4m Methods," ACM Transactions on Mathematical Software, 2016, pp. 0:1-0:36.

\* cited by examiner

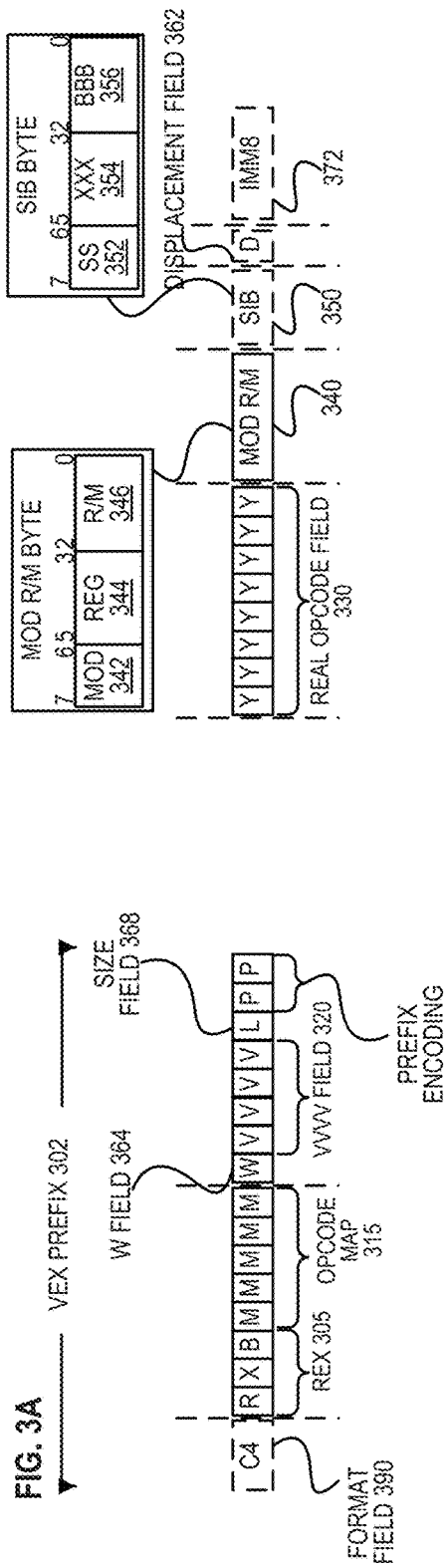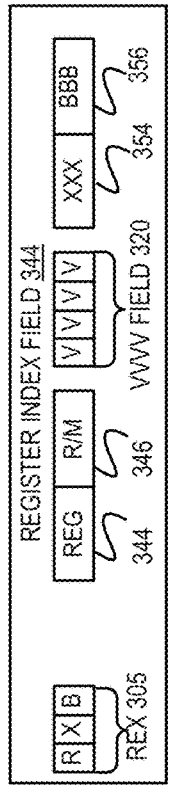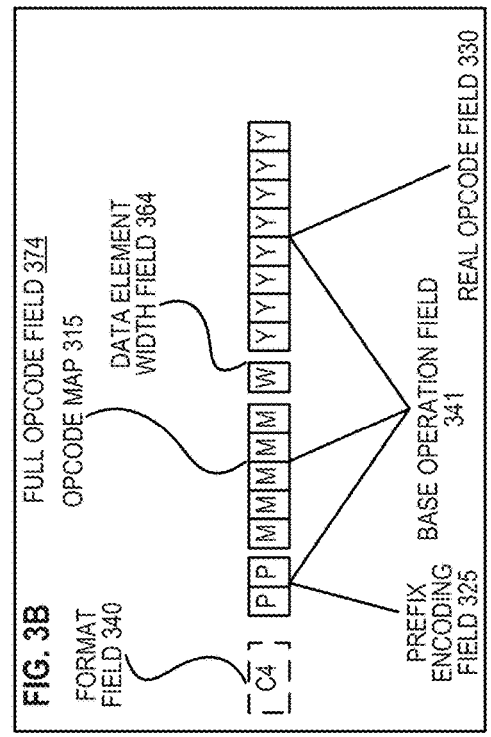

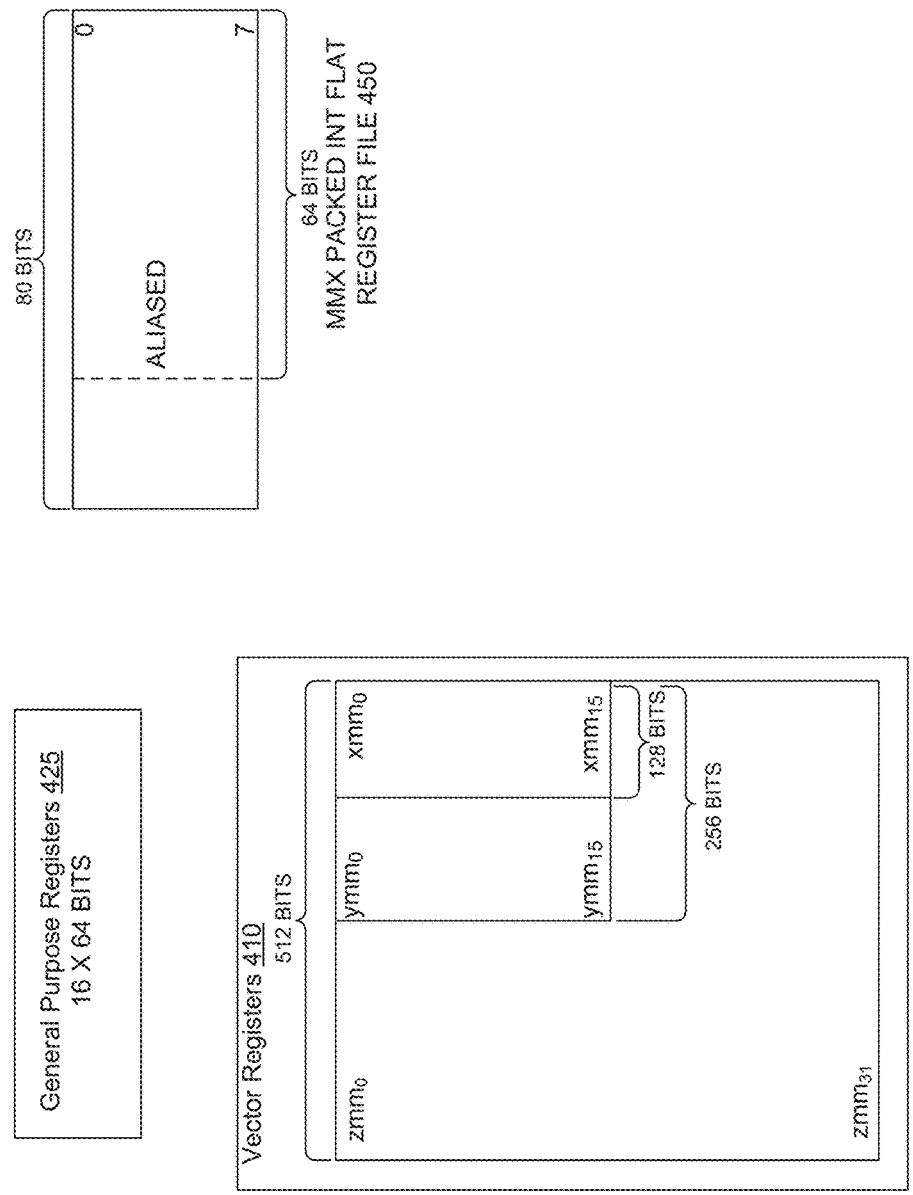

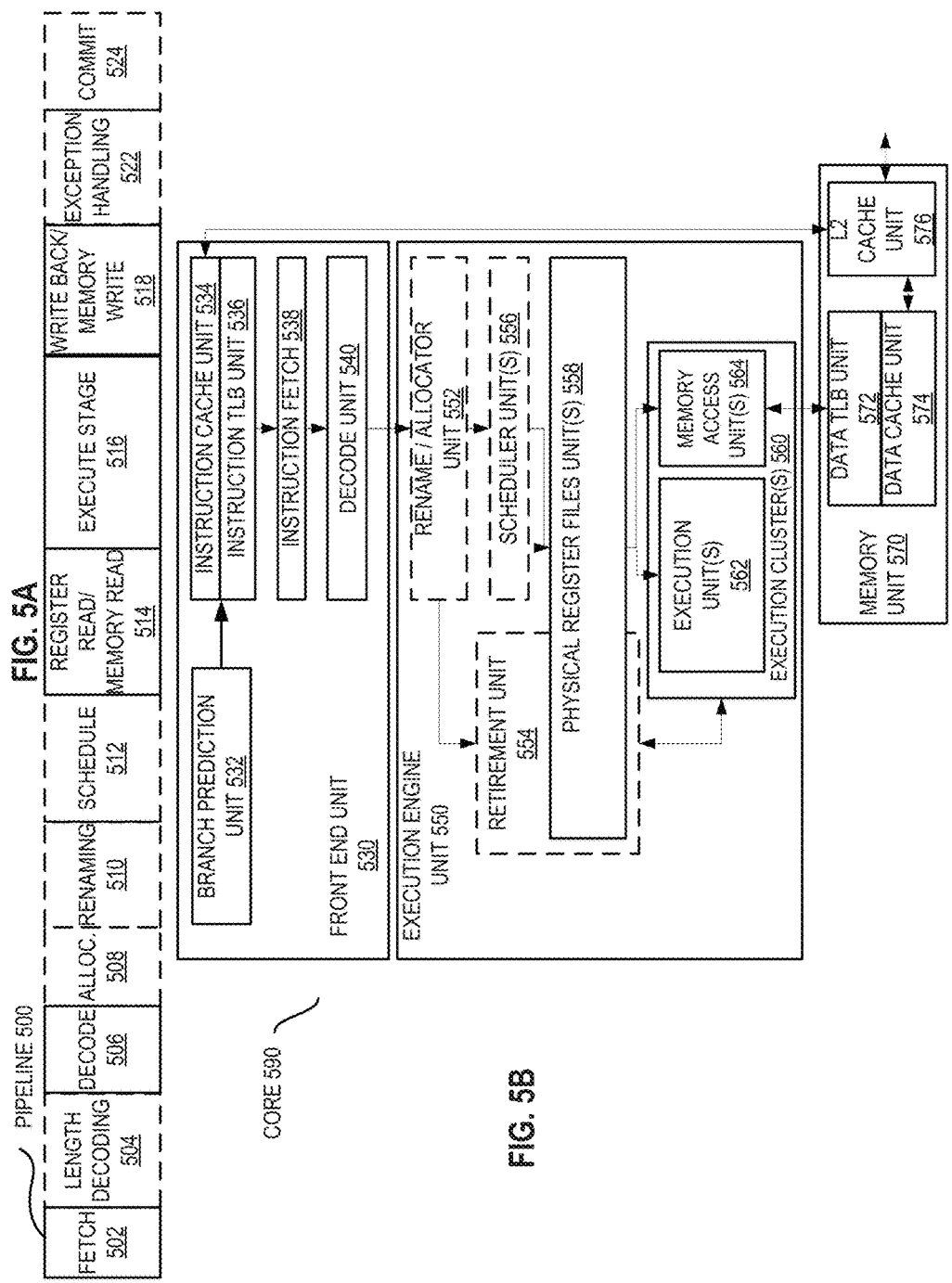

SYSTEMS, APPARATUSES, AND METHODS FOR MULTIPLICATION, NEGATION, AND ACCUMULATION OF VECTOR PACKED SIGNED VALUES

TECHNICAL FIELD

Embodiments of the invention relate to the field of computer processor architecture. More specifically, the embodiments relate to instructions which, when executed, cause multiplication, negation, and accumulation of vector packed signed data values.

BACKGROUND

An instruction set, or instruction set architecture (ISA), is the part of the computer architecture related to programming, including the native data types, instructions, register architecture, addressing modes, memory architecture, interrupt and exception handling, and external input and output (I/O). Here, the term "instruction" generally refers to macro-instructions—that is, instructions that are provided to a processor for execution—as opposed to micro-instructions or micro-ops—that is, the result of a processor's decoder decoding a macro-instruction. The micro-instructions or micro-ops can be configured to instruct an execution unit on the processor to perform operations to implement the logic associated with the macro-instruction.

The ISA is distinguished from the microarchitecture, which is the set of processor design techniques used to implement an instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (for example, the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (for example, physical register, reorder buffer, retirement register, register pool).

Multiply—accumulate is a common digital signal processing operation which computes the product of two numbers and adds that product to an accumulated value. Existing single instruction multiple data (SIMD) microarchitectures implement multiply-accumulate operations by executing a sequence of instructions. For example, a multiply-accumulate may be performed with a multiply instruction, followed by a 4-way addition, and then an accumulation with the destination quadword data to generate two 64-bit saturated results. This leads to lower performance, as these sequences of instructions are run for each operation.

BRIEF DESCRIPTION OF THE DRAWINGS

The invention may best be understood by referring to the following description and accompanying drawings that are used to illustrate embodiments of the invention. In the drawings:

FIGS. 3A-3C illustrate an exemplary instruction format;

FIG. 4 is a block diagram of a register architecture according to one embodiment of the invention;

FIGS. 5A-5B illustrate the in-order pipeline and in-order core;

DETAILED DESCRIPTION

Figure 1:
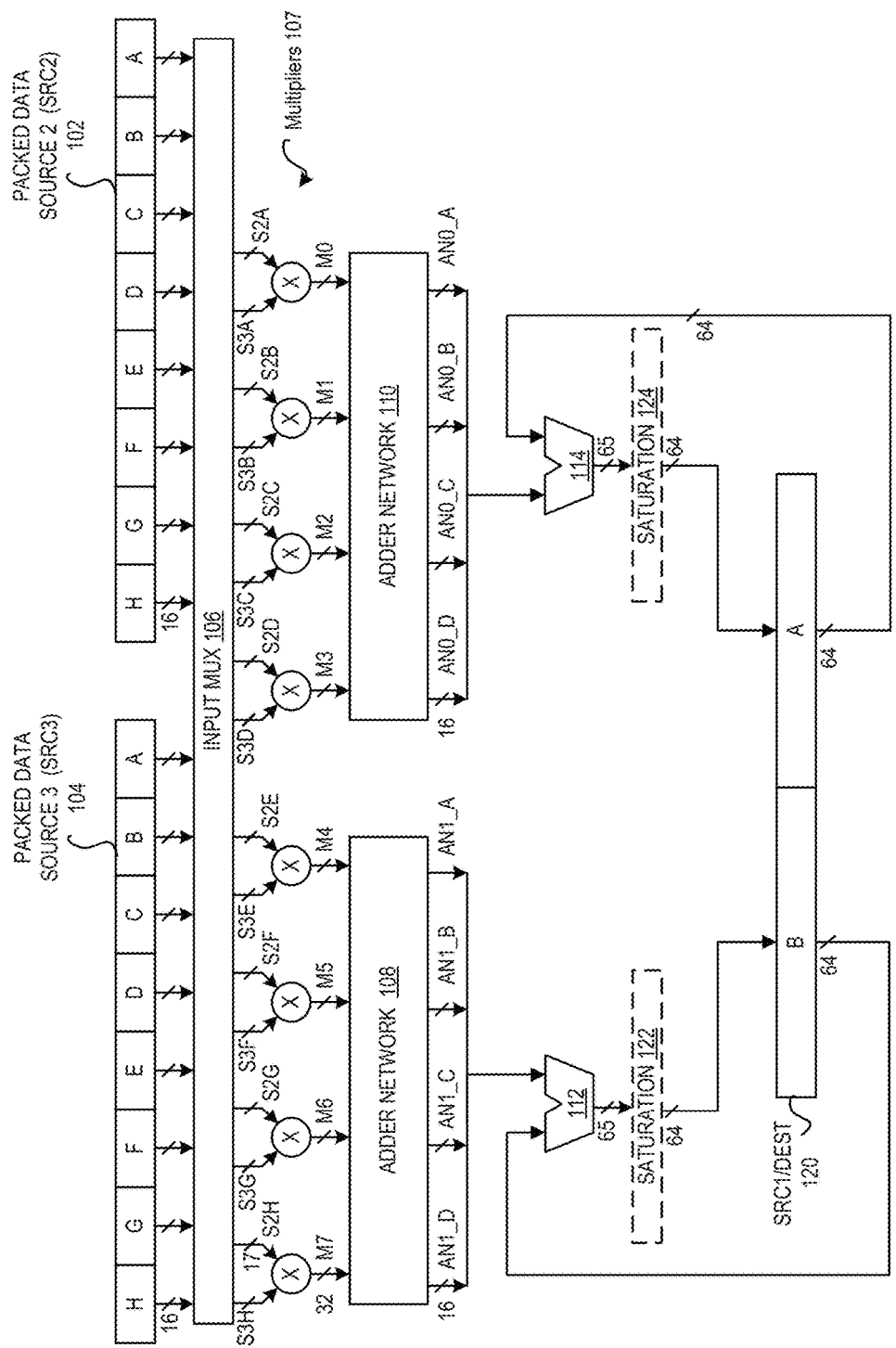
FIG. 1 illustrates an exemplary execution of a vector packed signed multiply, negate, and accumulate instruction, according to embodiments.

The following description describes methods and apparatus for a vector packed instruction that implements vector packed signed multiplication, negation, and accumulation of signed word values. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (for example, large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Vector Multiplication, Negation, and Accumulation of Signed Words

In an embodiment, a new vector packed instruction is disclosed that implements multiplication, negation, and accumulation of signed word values. Whereas previous implementations required sequences of instructions to be executed to generate output corresponding to multiplication, negation, and accumulation of signed word values, embodiments disclosed herein provide a single instruction and associated circuitry to perform these operations on word values of vector source registers. These embodiments improve a computer itself by speeding up the performance of these operations (and therefore typically using less power) relative to executing a plurality of separate instructions.

As indicated above, the execution of the instruction(s) disclosed herein causes an execution circuit (or execution unit) to perform multiplication, negation, and accumulation operations on source data. In some embodiments, the execution of a multiplication, negation, and accumulation instruction causes an execution circuit to multiply selected data values from a plurality of packed data element positions in first and second packed data source operands to generate a plurality of first result values; sum the plurality of first result values to generate one or more second result values; negate the one or more second result values to generate one or more third result values; accumulate the one or more third result values with one or more data values from a destination operand to generate one or more fourth result values; and store the one or more fourth result values in one or more packed data element positions in the destination operand. In some embodiments, execution of the instruction further includes saturating the one or more fourth result values using saturation circuitry and storing the saturated results in the one or more packed data element positions in the destination operand.

FIG. 1 illustrates one embodiment of circuitry used to execute an instruction that causes multiplication, negation, and accumulation of vector packed signed values. The multiplication, negation, and accumulation instruction format includes fields for a destination (packed data destination (SRC1/DEST) 120) and two sources (vector packed data source 2 (SRC2) 102 and vector packed data source 3 (SRC3) 104). For example, SRC2 102 and SRC3 104 can each include eight word values. While each source is 128 bits and each data element is 16 bits in the illustrated example of FIG. 1, the underlying principles described herein are not limited to any particular source or data element sizes. For example, in other embodiments, data source sizes of 128 bits, 256 bits, 512 bits, and so forth, can be used. Similarly, vector data element sizes of 32 bits, 64 bits, 128 bits, and so forth, can be used. As indicated above, execution of the instruction multiplies, negates, and accumulates the values stored in the SRC2 102 and SRC3 104 sources. In this example, multiplication is performed first followed by negation, accumulation, and optional saturation of the input values.

Vector packed data source 2 102 includes eight packed data elements (shown as packed data element positions A-H). Depending upon the implementation, vector packed data source 2 102 is a packed data register (for example, a XMM, YMM, ZMM, vector, SIMD, D, or S register) or a memory location. Similarly, vector packed data source 3 104 includes eight packed data elements (also shown as packed data element positions A-H). Depending upon the implementation, vector packed data source 3 104 is a packed data register (for example, a XMM, YMM, ZMM, vector, SIMD, D, or S register) or a memory location.

The two packed data sources 102, 104 are fed into execution circuitry to be operated on. As shown, the execution circuitry can include an input mux 106 which passes the values from the packed data sources 102, 104 to a plurality of multipliers 107. As discussed, corresponding values of the packed data sources 102, 104 are multiplied and the results are then negated, accumulated, and optionally saturated, as described in more detail below.

The multipliers 107 can perform vector multiplication on the data sources 102, 104, where each multiplier multiples a selected vector data element from SRC2 102 with a selected vector data element from SRC3 104. In some embodiments, each input value may be a signed value. As shown in FIG. 1, the multipliers 107 generate the following values S2(H)*S3(H), S2(G)*S3(G), S2(F)*S3(F), S2(E)*S3(E), S2(D)*S3(D), S2(C)*S3(C), S2(B)*S3(B), S2(A)*S3(A), where S2 identifies the first source 102 and S3 identifies the second source 104, and A, B, C, D, E, F, G, and H identify the packed data element positions in the data sources 102, 104 ordered from lowest to highest data element positions. Note that while a plurality of multipliers is shown, in some embodiments, the same multiplier is used to multiply each of the value pairs.

In the embodiment shown in FIG. 1, adder networks 108, 110 can combine the outputs of multipliers 107. As such, the multiplication, negation, and accumulation instruction calculates a product of corresponding pairs of values in the sources and sums the respective product values. A pseudocode representation of this is shown below:

TEMP0[33:0]←(SRC2[63:48]*SRC3 [63:48])+(SRC2[47:32]*SRC3[47:32])+(SRC2[31:16]*SRC3[31:16])+(SRC2[15:0]*SRC3[15:0]))
TEMP1[33:0]←(SRC2[127:112]*SRC3[127:112])+(SRC2[111:96]*SRC3[111:96])+(SRC2[95:80]*SRC3 [95:80])+(SRC2[79:64]*SRC3 [79:64]

As shown, the results of multiplying and summing the word values contained in the lower 64 bits of SRC2 and SRC3 can be stored to a first temporary register TEMP0 and the results of multiplying and summing the word values contained in the upper 64 bits of SRC2 and SRC3 can be stored to a second temporary register TEMP1.

In an embodiment, the value stored in the first temporary register TEMP0 can be negated and stored in a third temporary register TEMP2 and the value stored in the second temporary register TEMP1 can be negated and stored in a fourth temporary register TEMP3. For example, the negation of the values stored in the TEMP0 and TEMP1 temporary registers can be performed by adder networks 108, 110 or other circuitry. A pseudocode representation of the negation of the values in the TEMP0 and TEMP1 temporary registers is shown below:

TEMP2[33:0]←~TEMP0[33:0]+1'b1 (*Negate and wrap*)
TEMP3[33:0]←~TEMP1 [33:0]+1'b1 (*Negate and wrap*)

Vector packed data destination 120 stores the results from the adder networks 108 and 110 via accumulators 112, 114. Depending upon the implementation, packed data source 1/destination 120 is a packed data register (for example, a XMM, YMM, ZMM, vector, SIMD, D, S, or other register) or a memory location. In this illustration, packed data destination 120 is the same as packed data source 1, however, that does not need to be the case. In some embodiments, before adding to the appropriate accumulator 112, 114 each of the results can be sign extended and accumulated to the corresponding 64 bits of values in the destination registers. For example, as shown in the following pseudo-code representation, the results stored to the third temporary register TEMP2 can be signed extended and then stored to the lower 64 bits of the destination 120, and the results stored to the fourth register TEMP3 can be sign extended and stored to the upper 64 bits of the destination 120.
DEST[63:0]←AddToQuadWord({{30{TEMP2[33]}}, TEMP2[33:0]}, DEST[63:0]);
DEST[127:64]←AddToQuadWord({{30{TEMP3 [33]}}, TEMP3[33:0]}, DEST[127:64]);

In some embodiments, the sign extended results may be saturated using saturation circuitry 122, 124 before the results are stored to the vector packed data destination.

An embodiment of a format for a multiply, negate, and accumulate instruction is VPNDPWSSQ DEST1, SRC2, SRC3, where DEST1 is a field for the packed data destination register operand, SRC2 and SRC3 are fields for the sources such as packed data registers or memory. In some embodiments, the instruction can be VEX encoded.

In some embodiments, encodings of the multiplication, negation, and accumulation instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit (for example, XMM) register (vm32x), a 256-bit (for example, YMM) register (vm32y), or a 512-bit (for example, ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit (for example, XMM) register (vm64x), a 256-bit (for example, YMM) register (vm64y) or a 512-bit (for example, ZMM) register (vm64z).

Figure 2:
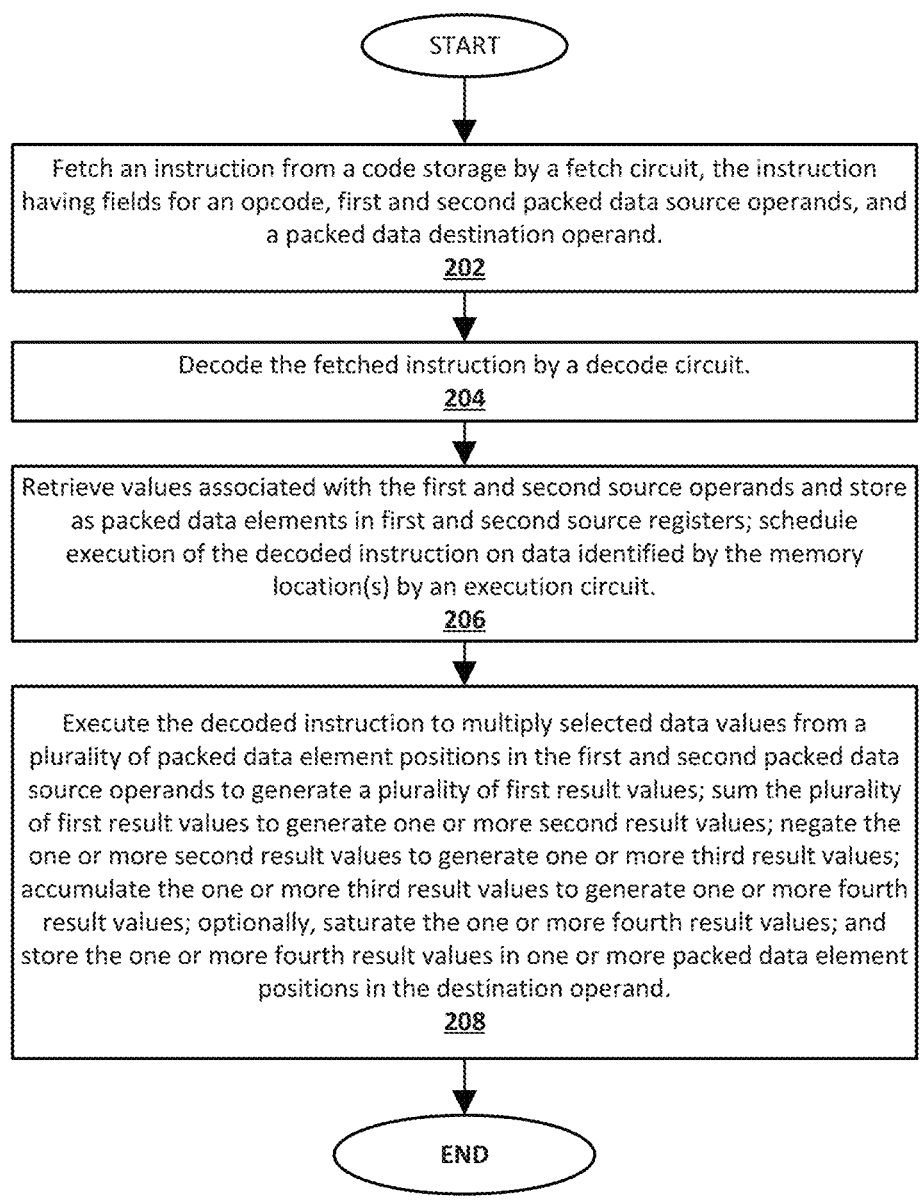
FIG. 2 illustrates an embodiment of a method performed by a processor to process a multiply, negate, and accumulate instruction, according to embodiments.

A method in accordance with one embodiment is illustrated in FIG. 2. The operations in the flow diagrams will be described with reference to the exemplary embodiments of the other figures. However, the operations of the flow diagrams can be performed by embodiments of the invention other than those discussed with reference to the other figures, and the embodiments of the invention discussed with reference to these other figures can perform operations different than those discussed with reference to the flow diagrams.

At block 202, the process fetches an instruction from a code storage by a fetch circuit, the instruction having fields for an opcode, first and second packed data source operands, and a packed data destination operand. In an embodiment, the destination operand and the first and second source operands are vector packed data.

At block 204, a decode circuit decodes the fetched instruction. For example, the fetched multiply, negate, and accumulate instruction is decoded by decode circuitry such as that detailed herein.

At block 206, execution of the decoded instruction on data identified by the source operands by an execution circuit is scheduled. In an embodiment, the first source operand identifies a first source register storing a first plurality of signed input values and the second source operand identifies a second source register storing a second plurality of signed input values. In some embodiments, the decoded instruction further indicates whether the result values are to be saturated.

At block 208, the execution circuit executes the decoded instruction to multiply selected data values from a plurality of packed data element positions in the first and second packed data source operands to generate a plurality of first result values; sum the plurality of first result values to generate one or more second result values; negate the one or more second result values to generate one or more third result values; accumulate the one or more third results with one or more data values from the destination operand to generate one or more fourth result values; optionally, saturate the one or more fourth result values; and store the one or more fourth result values in one or more packed data element positions in the destination operand.

For example, in reference again to FIG. 1, a plurality of multipliers 107 can multiply selected data values from a plurality of packed data element positions in first and second packed data source operands (for example, data sources 102, 104) to generate a plurality of first result values. The plurality of first result values can be summed by the one or more adder networks (for example, adder networks 108, 110) to generate the one or more second result values and the adder networks (or other circuitry) can further negate the one or more second result values to generate the one or more third result values. The one or more third result values can be accumulated with one or more data values from the destination operand (for example, vector packed data destination 120) by the one or more accumulators 112, 114. In some embodiments, the one or more third results optionally can be saturated by saturation circuitry 122, 124. The one or more fourth result values can be stored in one or more packed data element positions in a destination operand, for example, in data element positions of the vector packed data destination 120.

In an embodiment, executing the decoded instruction further includes multiplexing data values from the plurality of packed data element positions in the first and second packed data source operands to at least one multiplier circuit. For example, data values of the first and second packed data sources 102, 104 can be multiplexed by an input mux 106 to the multipliers 107. As shown in FIG. 1, the data values of the first and second packed data sources 102, 104 are multiplexed based on data values sharing a same packed data element position in the first and second packed data source operands (for example, the data value at position H of packed data source 3 104 is sent for multiplication with the corresponding data value at position H of packed data source 2 102).

In an embodiment, storing the one or more third result values includes storing one result in an upper half of the packed data destination operand (for example, the result from adder network 108 and accumulator 112 is stored in an upper half of the packed data destination 120) and storing another result in a lower half of the packed data destination operand (for example, the result from adder network 110 and accumulator 114 is stored in a lower half of the packed data destination 120).

Exemplary embodiments are detailed below.

1. A method for executing an instruction, the method comprising: decoding an instruction by a decode circuit, the instruction having fields for a first and second packed data source operand, and a packed data destination operand; executing the decoded instruction by an execution circuit by: multiplying selected data values from a plurality of packed data element positions in the first and second packed data source operands to generate a plurality of first result values; summing the plurality of first result values to generate one or more second result values; negating the one or more second result values to generate one or more third result values; accumulating the one or more third result values with one or more data values from the destination operand to generate one or more fourth result values; and storing the one or more fourth result values in one or more packed data element positions in the destination operand.

2. The method of example 1, wherein executing the decoded instruction by the execution circuit further includes multiplexing data values from the plurality of packed data element positions in the first and second packed data source operands to at least one multiplier circuit.

3. The method of example 2, wherein the data values from the plurality of packed data elements positions in the first and second packed data source operands are multiplexed to the at least one multiplier circuit based on data values sharing a same packed data element position in the first and second packed data source operands.

4. The method of example 1, wherein the one or more second result values are generated by one or more adder networks.

5. The method of example 1, wherein storing the one or more third result values includes storing a result value in an upper half of the packed data destination operand and storing a result value in a lower half of the packed data destination operand.

6. The method of example 1, wherein the multiplying the selected data values includes: performing the operations S1H*S2H, S1G*S2G, S1F*S2F, and S1E*S2E and the operations S1D*S2D, S1C*S2C, S1B*S2B, and S1A*S2A to generate the plurality of first result values, wherein S1 identifies the first packed data source operand, S2 identifies the second packed data source operand, and A, B, C, D, E, F, G, and H identify the packed data element positions in the first and second packed data source operands ordered from lowest to highest data element positions.

7. The method of example 6, wherein summing the plurality of first result values includes performing the operations (S1H*S2H)+(S1G*S2G)+(S1F*S2F)+(S1E*S2E) and performing the operations (S1H*S2H)+(S1G*S2G)+(S1B*S2B)+(S1A*S2A) to generate the one or more second result values.

8. The method of example 1, further comprising, in response to detecting that a value of the one or more third result values is above a threshold value, storing a maximum value in the corresponding position of the destination operand.

9. An apparatus comprising: a decoder to decode an instruction having fields for a first and second packed data source operand, and a packed data destination operand; and execution circuitry to execute the decoded instruction to: multiply selected data values from a plurality of packed data element positions in the first and second packed data source operands to generate a plurality of first result values; sum the plurality of first result values to generate one or more second result values; negate the one or more second result values to generate one or more third result values; accumulate the one or more third result values with one or more data values from the destination operand to generate one or more fourth result values; and store the one or more fourth result values in one or more packed data element positions in the destination operand.

10. The apparatus of example 9, wherein executing the decoded instruction by the execution circuit further includes multiplexing data values from the plurality of packed data element positions in the first and second packed data source operands to at least one multiplier circuit.

11. The apparatus of example 9, wherein the data values from the plurality of packed data elements positions in the first and second packed data source operands are multiplexed to the at least one multiplier circuit based on data values sharing a same packed data element position in the first and second packed data source operands.

12. The apparatus of example 9, wherein the one or more second result values are generated by one or more adder networks.

13. The apparatus of example 9, wherein storing the one or more third result values includes storing a result value in an upper half of the packed data destination operand and storing a result value in a lower half of the packed data destination operand.

14. The apparatus of example 9, wherein the multiplying the selected data values includes: performing the operations S1H*S2H, S1G*S2G, S1F*S2F, and S1E*S2E and the operations S1D*S2D, S1C*S2C, S1B*S2B, and S1A*S2A to generate the plurality of first result values, wherein S1 identifies the first packed data source operand, S2 identifies the second packed data source operand, and A, B, C, D, E, F, G, and H identify the packed data element positions in the first and second packed data source operands ordered from lowest to highest data element positions.

15. The apparatus of example 9, wherein summing the plurality of first result values includes performing the operations (S1H*S2H)+(S1G*S2G)+(S1F*S2F)+(S1E*S2E) and performing the operations (S1H*S2H)+(S1G*S2G)+(S1B*S2B)+(S1A*S2A) to generate the one or more second result values.

16. The apparatus of example 9, further comprising, in response to detecting that a value of the one or more third result values is above a threshold value, storing a maximum value in the corresponding position of the destination operand.

17. A non-transitory machine-readable medium storing an instruction which when executed by a processor causes the processor to perform a method, the method comprising: decoding an instruction having fields for a first and a second packed data source operand, and a packed data destination operand, and executing the decoded instruction, by execution circuitry, to: multiply selected data values from a plurality of packed data element positions in the first and second packed data source operands to generate a plurality of first result values; sum the plurality of first result values to generate one or more second result values; negate the one or more second result values to generate one or more third result values; accumulate the one or more third result values with one or more data values from the destination operand to generate one or more fourth result values; and store the one or more fourth result values in one or more packed data element positions in the destination operand.

18. The non-transitory machine-readable medium of example 17, wherein executing the decoded instruction by the execution circuit further includes multiplexing data values from the plurality of packed data element positions in the first and second packed data source operands to at least one multiplier circuit.

19. The non-transitory machine-readable medium of example 18, wherein the data values from the plurality of packed data elements positions in the first and second packed data source operands are multiplexed to the at least one multiplier circuit based on data values sharing a same packed data element position in the first and second packed data source operands.

20. The non-transitory machine-readable medium of example 17, wherein the one or more second result values are generated by one or more adder networks.

21. The non-transitory machine-readable medium of example 17, wherein storing the one or more fourth result values includes storing a result value in an upper half of the packed data destination operand and storing a result value in a lower half of the packed data destination operand.

22. The non-transitory machine-readable medium of example 17, wherein the multiplying the selected data values includes: performing the operations S1H*S2H, S1G*S2G, S1F*S2F, and S1E*S2E and the operations S1D*S2D, S1C*S2C, S1B*S2B, and S1A*S2A to generate the plurality of first result values, wherein S1 identifies the first packed data source operand, S2 identifies the second packed data source operand, and A, B, C, D, E, F, G, and H identify the packed data element positions in the first and second packed data source operands ordered from lowest to highest data element positions.

23. The non-transitory machine-readable medium of example 17, wherein summing the plurality of first result values includes performing the operations (S1H*S2H)+(S1G*S2G)+(S1F*S2F)+(S1E*S2E) and performing the operations (S1H*S2H)+(S1G*S2G)+(S1B*S2B)+(S1A*S2A) to generate the one or more second result values.

24. The non-transitory machine-readable medium of example 17, further comprising, in response to detecting that a value of the one or more third result values is above a threshold value, storing a maximum value in the corresponding position of the destination operand.

Detailed Exemplary Systems, Processors, and Emulation

Detailed herein are examples of hardware, software, etc. to execute the above described instructions. For example, what is described below details aspects of instruction execution including various pipeline stages such as fetch, decode, schedule, execute, retire, etc.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down through the definition of instruction templates (or subformats). For example, the instruction templates of a given instruction format may be defined to have different subsets of the instruction format's fields (the included fields are typically in the same order, but at least some have different bit positions because there are fewer fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2). An occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 3A illustrates an exemplary AVX instruction format including a VEX prefix 302, real opcode field 330, Mod R/M byte 340, SIB byte 350, displacement field 362, and IMM8 372. FIG. 3B illustrates which fields from FIG. 3A make up a full opcode field 374 and a base operation field 341. FIG. 3C illustrates which fields from FIG. 3A make up a register index field 344.

VEX Prefix (Bytes 0-2) 302 is encoded in a three-byte form. The first byte is the Format Field 390 (VEX Byte 0, bits [7:0]), which contains an explicit C4 byte value (the unique value used for distinguishing the C4 instruction format). The second and third bytes (VEX Bytes 1 and 2) include several bit fields providing specific capability. Specifically, REX field 305 (VEX Byte 1, bits [7:5]) consists of a VEX.R bit field (VEX Byte 1, bit [7]—R), VEX.X bit field (VEX byte 1, bit [6]—X), and VEX.B bit field (VEX byte 1, bit[5]—B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 315 (VEX byte 1, bits [4:0]—mmmmm) includes content to encode an implied leading opcode byte. W Field 364 (VEX byte 2, bit [7]—W)—is represented by the notation VEX.W and provides different functions depending on the instruction. The role of VEX.vvvv 320 (VEX Byte 2, bits [6:3]—vvvv) may include the following: 1) VEX.vvvv encodes the first source register operand, specified in inverted (1s complement) form and is valid for instructions with 2 or more source operands; 2) VEX.vvvv encodes the destination register operand, specified in is complement form for certain vector shifts; or 3) VEX.vvvv does not encode any operand, the field is reserved and should contain 1111b. If VEX.L 368 Size field (VEX byte 2, bit [2]—L)=0, it indicates 128-bit vector; if VEX.L=1, it indicates 256-bit vector. Prefix encoding field 325 (VEX byte 2, bits [1:0]—pp) provides additional bits for the base operation field 341.

Real Opcode Field 330 (Byte 3) is also known as the opcode byte. Part of the opcode is specified in this field.

MOD R/M Field 340 (Byte 4) includes MOD field 342 (bits [7:6]), Reg field 344 (bits [5:3]), and R/M field 346 (bits [2:0]). The role of Reg field 344 may include the following: encoding either the destination register operand or a source register operand (the rrr of Rrrr), or be treated as an opcode extension and not used to encode any instruction operand. The role of R/M field 346 may include the following: encoding the instruction operand that references a memory address, or encoding either the destination register operand or a source register operand.

Scale, Index, Base (SIB)—The content of Scale field 350 (Byte 5) includes SS 352 (bits [7:6]), which is used for memory address generation. The contents of SIB.xxx 354 (bits [5:3]) and SIB.bbb 356 (bits [2:0]) have been previously referred to with regard to the register indexes Xxxx and Bbbb.

The Displacement Field 362 and the immediate field (IMM8) 372 contain data.

Exemplary Register Architecture

FIG. 4 is a block diagram of a register architecture 400 according to one embodiment of the invention. In the embodiment illustrated, there are 32 vector registers 410 that are each 512 bits wide; these registers are referenced as zmm0 through zmm31. The lower order 256 bits of the lower 410 zmm registers are overlaid on registers ymm0-15. The lower order 128 bits of the lower 410 zmm registers (the lower order 128 bits of the ymm registers) are overlaid on registers xmm0-15.

General-purpose registers 425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 445, on which is aliased the MMX packed integer flat register file 450—in the embodiment illustrated, the x87 stack is an eight-element stack used to perform scalar floating-point operations on 32/64/80-bit floating point data using the x87 instruction set extension. The MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

In-Order and Out-of-Order Core Block Diagram

FIG. 5A is a block diagram illustrating both an exemplary in-order pipeline and an exemplary register renaming, out-of-order issue/execution pipeline according to embodiments of the invention. FIG. 5B is a block diagram illustrating both an exemplary embodiment of an in-order architecture core and an exemplary register renaming, out-of-order issue/execution architecture core to be included in a processor according to embodiments of the invention. The solid lined boxes in FIGS. 5A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524.

FIG. 5B shows processor core 590 including a front-end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front-end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (or decoder) may decode instructions, and generate as an output of one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front-end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit and a scalar registers unit. These register units may provide architectural vector registers, vector mask registers, and general-purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 6B:
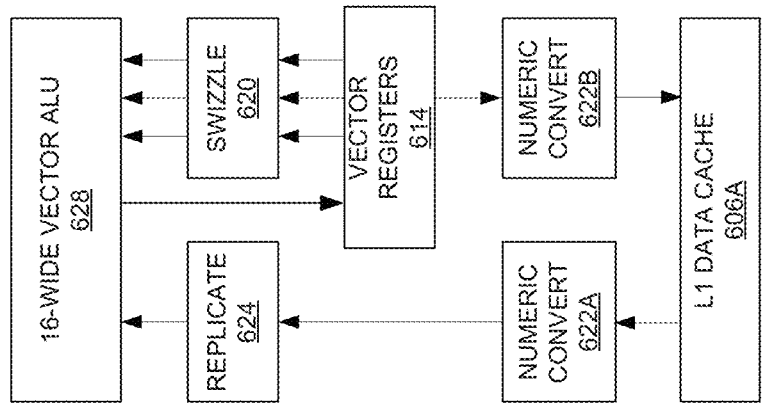
FIGS. 6A-6B illustrate a block diagram of a more specific exemplary in-order core architecture, which core would be one of several logic blocks (including other cores of the same type and/or different types) in a chip.
Figure 6A:
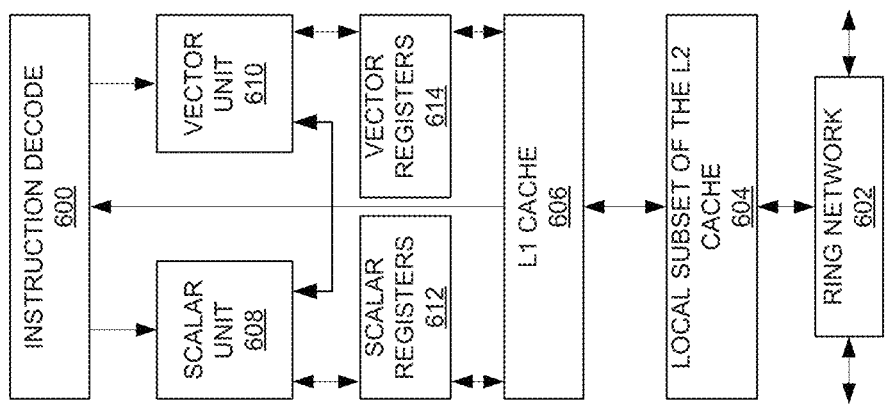

FIGS. 6A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 6A is a block diagram of a single processor core, along with its connection to the on-die interconnect network 602 and with its local subset of the Level 2 (L2) cache 604, according to embodiments of the invention. In one embodiment, an instruction decoder 600 supports the x86 instruction set with a packed data instruction set extension. An L1 cache 606 allows low-latency accesses to cache memory into the scalar and vector units. While in one embodiment (to simplify the design), a scalar unit 608 and a vector unit 610 use separate register sets (respectively, scalar registers 612 and vector registers 614) and data transferred between them is written to memory and then read back in from a level 1 (L1) cache 606, alternative embodiments of the invention may use a different approach (e.g., use a single register set or include a communication path that allow data to be transferred between the two register files without being written and read back).

The local subset of the L2 cache 604 is part of a global L2 cache that is divided into separate local subsets, one per processor core. Each processor core has a direct access path to its own local subset of the L2 cache 604. Data read by a processor core is stored in its L2 cache subset 604 and can be accessed quickly, in parallel with other processor cores accessing their own local L2 cache subsets. Data written by a processor core is stored in its own L2 cache subset 604 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 6B is an expanded view of part of the processor core in FIG. 6A according to embodiments of the invention. FIG. 6B includes an L1 data cache 606A part of the L1 cache 604, as well as more detail regarding the vector unit 610 and the vector registers 614. Specifically, the vector unit 610 is a 10-wide vector processing unit (VPU) (see the 16-wide ALU 628), which executes one or more of integer, single-precision float, and double-precision float instructions. The VPU supports swizzling the register inputs with swizzle unit 620, numeric conversion with numeric convert units 622A-B, and replication with replication unit 624 on the memory input.

Processor with Integrated Memory Controller and Graphics

Figure 7:
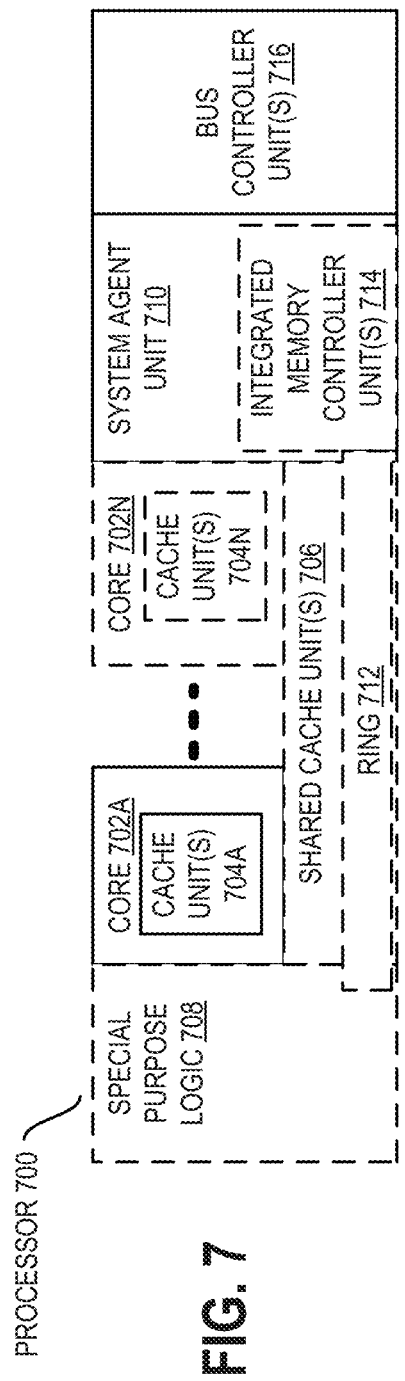
FIG. 7 is a block diagram of a processor that may have more than one core, may have an integrated memory controller, and may have integrated graphics according to embodiments of the invention.

FIG. 7 is a block diagram of a processor 700 that may have more than one core, may have an integrated memory controller, and may have integrated graphics according to embodiments of the invention. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache within the cores 704A-N, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof. While in one embodiment a ring based interconnect unit 712 interconnects the integrated graphics logic 708, the set of shared cache units 706, and the system agent unit 710/integrated memory controller unit(s) 714, alternative embodiments may use any number of well-known techniques for interconnecting such units. In one embodiment, coherency is maintained between one or more cache units 706 and cores 702-A-N.

In some embodiments, one or more of the cores 702A-N are capable of multi-threading. The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set.

Exemplary Computer Architectures

FIGS. 8-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
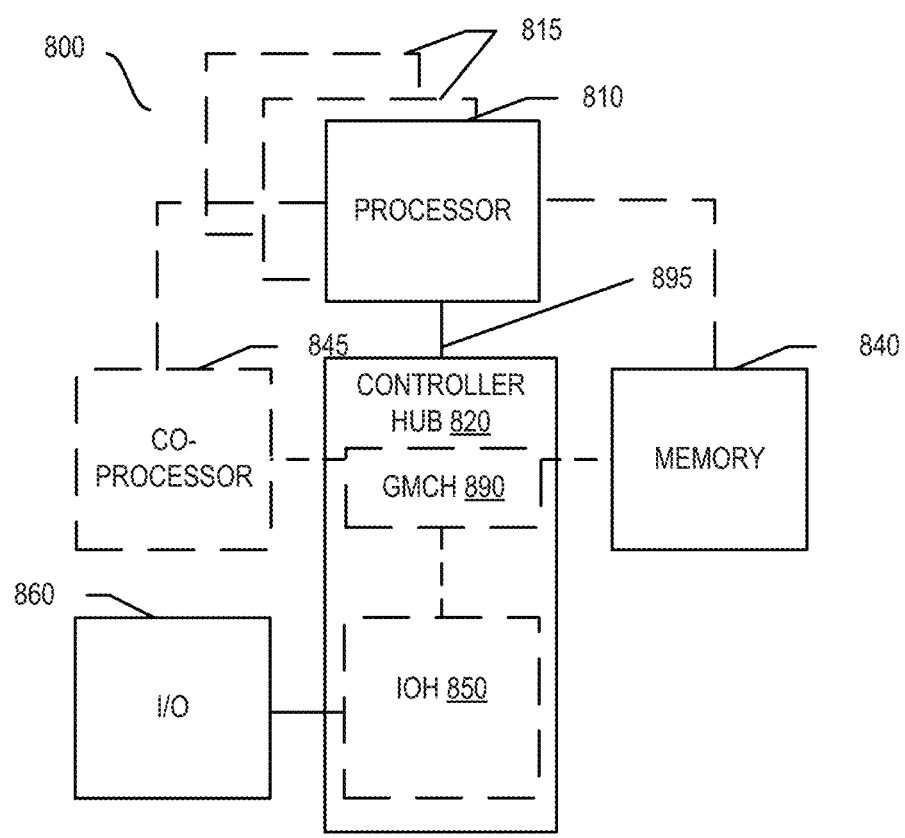
FIGS. 8-11 are block diagrams of exemplary computer architectures.

Referring now to FIG. 8, shown is a block diagram of a system 800 in accordance with one embodiment of the present invention. The system 800 may include one or more processors 810, 815, which are coupled to a controller hub 820. In one embodiment, the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 700.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface, or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
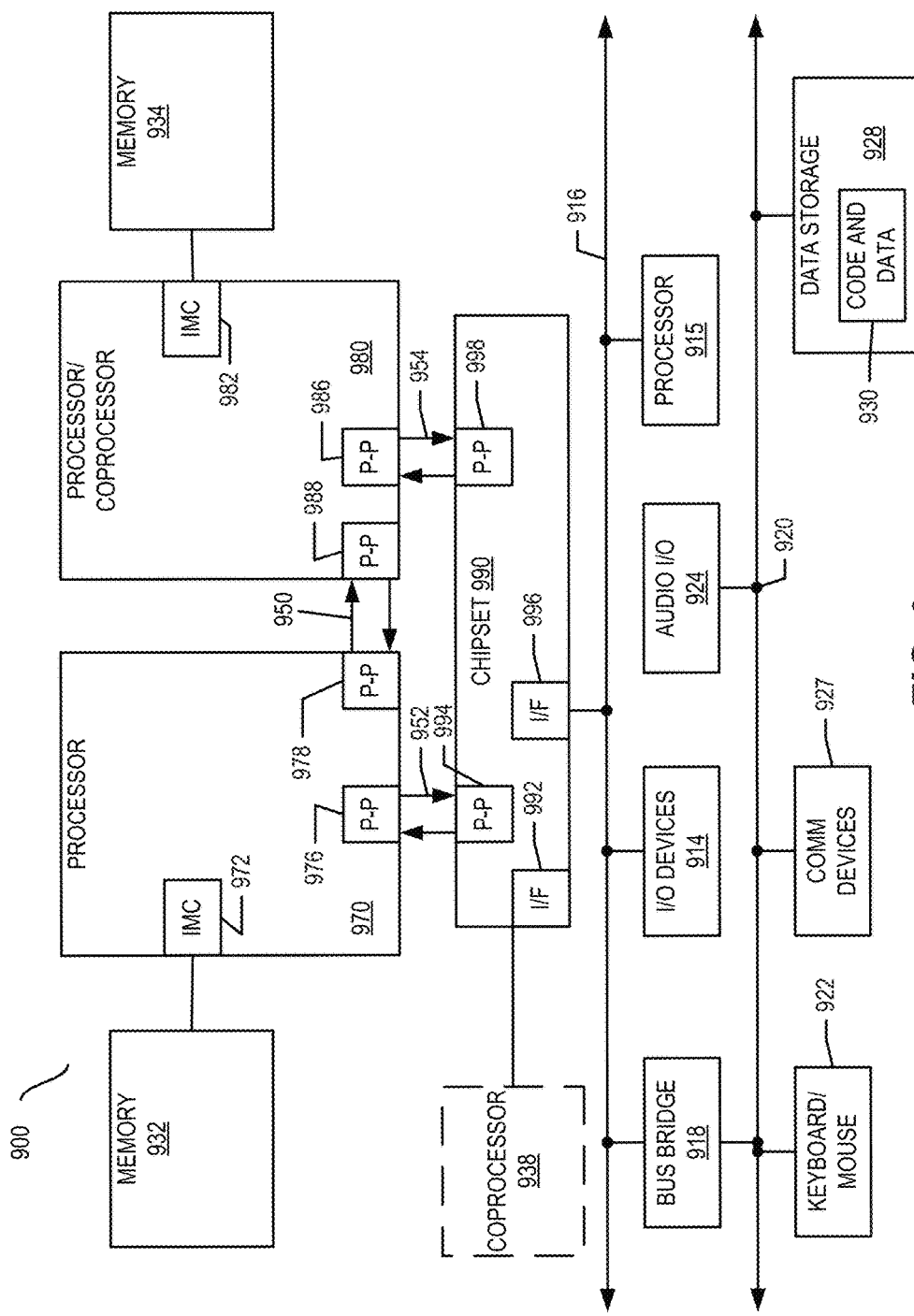

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 700. In one embodiment of the invention, processors 970 and 980 are respectively processors 810 and 815, while coprocessor 938 is coprocessor 845. In another embodiment, processors 970 and 980 are respectively processor 810 coprocessor 845.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 992. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
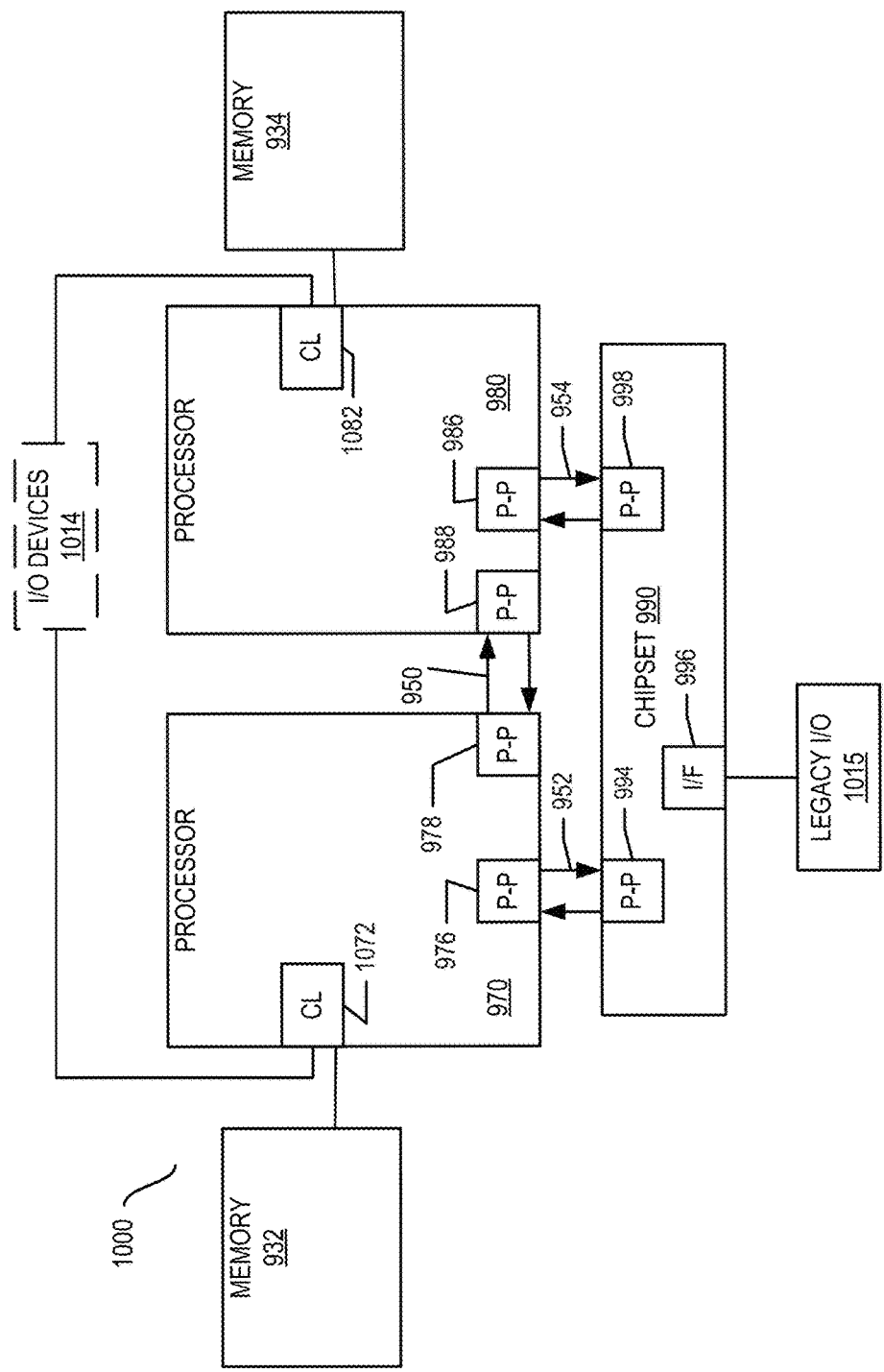

Referring now to FIG. 10, shown is a block diagram of a second more specific exemplary system 1000 in accordance with an embodiment of the present invention. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processors 970, 980 may include integrated memory and I/O control logic ("CL") 1072 and 1082, respectively. Thus, the CL 1072, 1082 include integrated memory controller units and include I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chipset 990.

Figure 11:
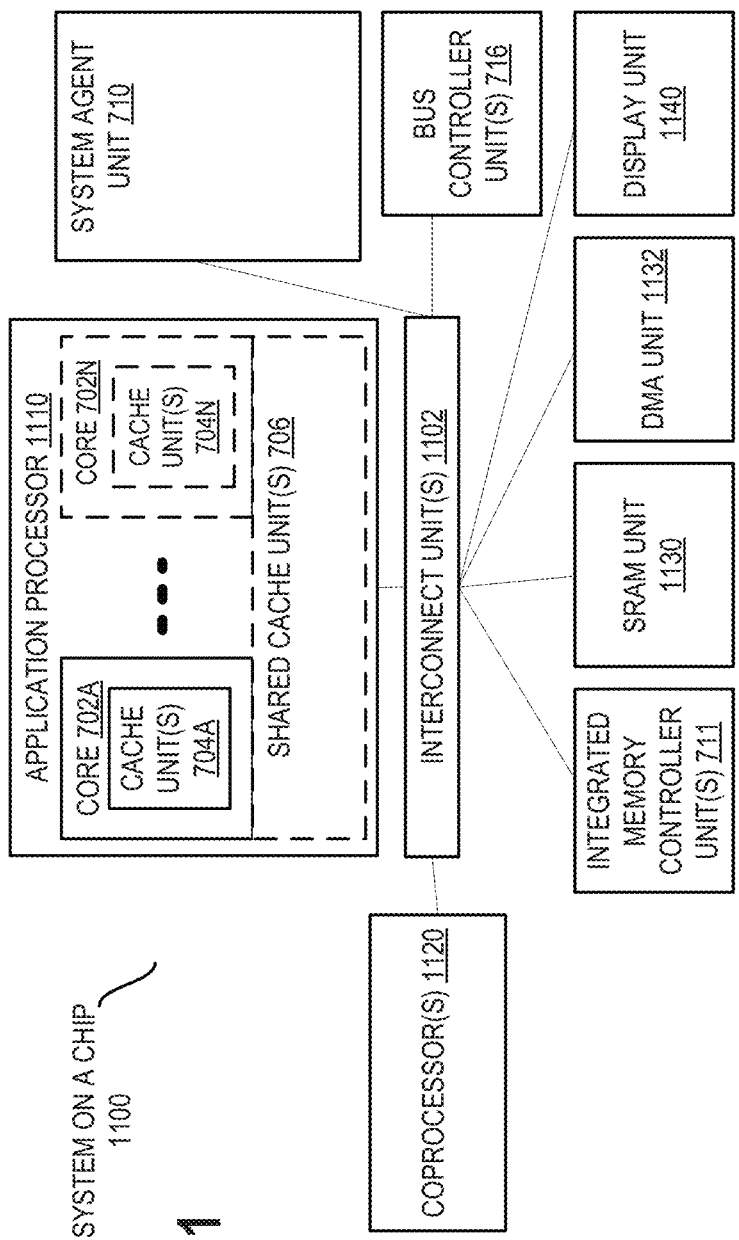

Referring now to FIG. 11, shown is a block diagram of a SoC 1100 in accordance with an embodiment of the present invention. Similar elements in FIG. 7 bear like reference numerals. Also, dashed lined boxes are optional features on more advanced SoCs. In FIG. 11, an interconnect unit(s) 1102 is coupled to: an application processor 910 which includes a set of one or more cores 702A-N, cache units 704A-N, and shared cache unit(s) 706; a system agent unit 710; a bus controller unit(s) 716; an integrated memory controller unit(s) 714; a set or one or more coprocessors 1120 which may include integrated graphics logic, an image processor, an audio processor, and a video processor; an static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
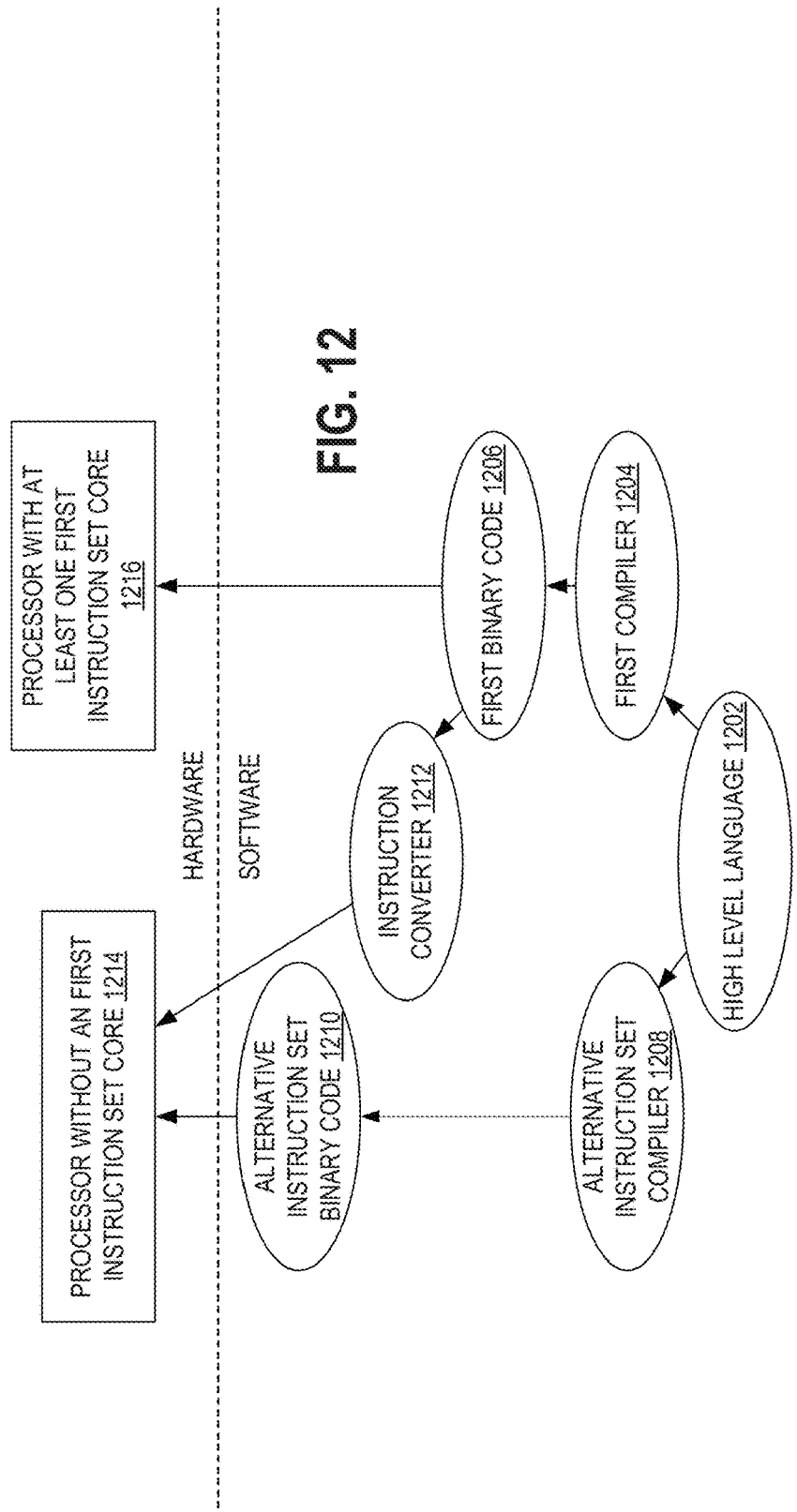
FIG. 12 is a block diagram contrasting the use of a software instruction converter to convert binary instructions in a source instruction set to binary instructions in a target instruction set according to embodiments of the invention.

FIG. 12 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 12 shows a program in a high level language 1202 may be compiled using an first compiler 1204 to generate a first binary code (e.g., x86) 1206 that may be natively executed by a processor with at least one first instruction set core 1216. In some embodiments, the processor with at least one first instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1204 represents a compiler that is operable to generate binary code of the first instruction set 1206 (e.g., object code) that can, with or without additional linkage processing, be executed on the processor with at least one first instruction set core 1216. Similarly, FIG. 12 shows the program in the high level language 1202 may be compiled using an alternative instruction set compiler 1208 to generate alternative instruction set binary code 1210 that may be natively executed by a processor without at least one first instruction set core 1214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1212 is used to convert the first binary code 1206 into code that may be natively executed by the processor without an first instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have a first instruction set processor or core to execute the first binary code 1206.

What is claimed is:

1. A method, comprising:
   decoding an instruction by a decode circuit, the instruction having fields for a first and second packed data source operand, and a packed data destination operand;
   executing the decoded instruction by an execution circuit by:
      multiplying selected data values from a plurality of packed data element positions in the first and second packed data source operands to generate a plurality of first result values;
      summing the plurality of first result values to generate one or more second result values;

negating the one or more second result values to generate one or more third result values;
accumulating the one or more third result values with one or more data values from the destination operand to generate one or more fourth result values; and
storing the one or more fourth result values in one or more packed data element positions in the destination operand.

2. The method of claim 1, wherein executing the decoded instruction by the execution circuit further includes multiplexing data values from the plurality of packed data element positions in the first and second packed data source operands to at least one multiplier circuit.

3. The method of claim 2, wherein the data values from the plurality of packed data elements positions in the first and second packed data source operands are multiplexed to the at least one multiplier circuit based on data values sharing a same packed data element position in the first and second packed data source operands.

4. The method of claim 1, wherein the one or more second result values are generated by one or more adder networks.

5. The method of claim 1, wherein storing the one or more third result values includes storing a result value in an upper half of the packed data destination operand and storing a result value in a lower half of the packed data destination operand.

6. The method of claim 1, wherein the multiplying the selected data values includes:
performing the operations S1H*S2H, S1G*S2G, S1F*S2F, and S1E*S2E and the operations S1D*S2D, S1C*S2C, S1B*S2B, and S1A*S2A to generate the plurality of first result values,
wherein S1 identifies the first packed data source operand, S2 identifies the second packed data source operand, and A, B, C, D, E, F, G, and H identify the packed data element positions in the first and second packed data source operands ordered from lowest to highest data element positions.

7. The method of claim 6, wherein summing the plurality of first result values includes performing the operations (S1H*S2H)+(S1G*S2G)+(S1F*S2F)+(S1E*S2E) and performing the operations (S1H*S2H)+(S1G*S2G)+(S1B*S2B)+(S1A*S2A) to generate the one or more second result values.

8. The method of claim 1, further comprising, in response to detecting that a value of the one or more third result values is above a threshold value, storing a maximum value in the corresponding position of the destination operand.

9. An apparatus, comprising:
a decoder to decode an instruction having fields for a first and second packed data source operand, and a packed data destination operand; and
execution circuitry to execute the decoded instruction to:
multiply selected data values from a plurality of packed data element positions in the first and second packed data source operands to generate a plurality of first result values;
sum the plurality of first result values to generate one or more second result values;
negate the one or more second result values to generate one or more third result values;
accumulate the one or more third result values with one or more data values from the destination operand to generate one or more fourth result values; and
store the one or more fourth result values in one or more packed data element positions in the destination operand.

10. The apparatus of claim 9, wherein executing the decoded instruction by the execution circuit further includes multiplexing data values from the plurality of packed data element positions in the first and second packed data source operands to at least one multiplier circuit.

11. The apparatus of claim 10, wherein the data values from the plurality of packed data elements positions in the first and second packed data source operands are multiplexed to the at least one multiplier circuit based on data values sharing a same packed data element position in the first and second packed data source operands.

12. The apparatus of claim 9, wherein the one or more second result values are generated by one or more adder networks.

13. The apparatus of claim 9, wherein storing the one or more third result values includes storing a result value in an upper half of the packed data destination operand and storing a result value in a lower half of the packed data destination operand.

14. The apparatus of claim 9, wherein the multiplying the selected data values includes:
performing the operations S1H*S2H, S1G*S2G, S1F*S2F, and S1E*S2E and the operations S1D*S2D, S1C*S2C, S1B*S2B, and S1A*S2A to generate the plurality of first result values,
wherein S1 identifies the first packed data source operand, S2 identifies the second packed data source operand, and A, B, C, D, E, F, G, and H identify the packed data element positions in the first and second packed data source operands ordered from lowest to highest data element positions.

15. The apparatus of claim 14, wherein summing the plurality of first result values includes performing the operations (S1H*S2H)+(S1G*S2G)+(S1F*S2F)+(S1E*S2E) and performing the operations (S1H*S2H)+(S1G*S2G)+(S1B*S2B)+(S1A*S2A) to generate the one or more second result values.

16. The apparatus of claim 9, further comprising, in response to detecting that a value of the one or more third result values is above a threshold value, storing a maximum value in the corresponding position of the destination operand.

17. A non-transitory machine-readable medium storing an instruction which when executed by a processor causes the processor to perform operations comprising:
decoding an instruction having fields for a first and a second packed data source operand, and a packed data destination operand, and
executing the decoded instruction, by execution circuitry, to:
multiply selected data values from a plurality of packed data element positions in the first and second packed data source operands to generate a plurality of first result values;
sum the plurality of first result values to generate one or more second result values;
negate the one or more second result values to generate one or more third result values;
accumulate the one or more third result values with one or more data values from the destination operand to generate one or more fourth result values; and
store the one or more fourth result values in one or more packed data element positions in the destination operand.

18. The non-transitory machine-readable medium of claim 17, wherein executing the decoded instruction by the execution circuit further includes multiplexing data values from the plurality of packed data element positions in the first and second packed data source operands to at least one multiplier circuit.

19. The non-transitory machine-readable medium of claim 18, wherein the data values from the plurality of packed data elements positions in the first and second packed data source operands are multiplexed to the at least one multiplier circuit based on data values sharing a same packed data element position in the first and second packed data source operands.

20. The non-transitory machine-readable medium of claim 17, wherein the one or more second result values are generated by one or more adder networks.

21. The non-transitory machine-readable medium of claim 17, wherein storing the one or more fourth result values includes storing a result value in an upper half of the packed data destination operand and storing a result value in a lower half of the packed data destination operand.

22. The non-transitory machine-readable medium of claim 17, wherein the multiplying the selected data values includes:

performing the operations S1H*S2H, S1G*S2G, S1F*S2F, and S1E*S2E and the operations S1D*S2D, S1C*S2C, S1B*S2B, and S1A*S2A to generate the plurality of first result values, wherein S1 identifies the first packed data source operand, S2 identifies the second packed data source operand, and A, B, C, D, E, F, G, and H identify the packed data element positions in the first and second packed data source operands ordered from lowest to highest data element positions.

23. The non-transitory machine-readable medium of claim 22, wherein summing the plurality of first result values includes performing the operations (S1H*S2H)+(S1G*S2G)+(S1F*S2F)+(S1E*S2E) and performing the operations (S1H*S2H)+(S1G*S2G)+(S1B*S2B)+(S1A*S2A) to generate the one or more second result values.

24. The non-transitory machine-readable medium of claim 17, further comprising, in response to detecting that a value of the one or more third result values is above a threshold value, storing a maximum value in the corresponding position of the destination operand.

* * * * *